United States Patent [19]

Costello

[11] Patent Number: 5,457,955
[45] Date of Patent: Oct. 17, 1995

[54] FLUID PURIFICATION WITH ISOLATION CHAMBERS

[76] Inventor: Burton W. Costello, 6780 Schooner Bay Cir., Sarasota, Fla. 34231

[21] Appl. No.: 207,530

[22] Filed: Mar. 7, 1994

[51] Int. Cl.⁶ ..................................................... F01N 3/20
[52] U.S. Cl. ................... 60/274; 60/275; 60/280; 60/299; 60/902
[58] Field of Search ................... 60/274, 275, 280, 60/299, 902

[56] References Cited

U.S. PATENT DOCUMENTS

| | | | |
|---|---|---|---|
| 2,880,079 | 3/1959 | Cornelius | 60/280 |
| 3,050,375 | 8/1962 | Block | 60/902 |
| 3,102,800 | 9/1963 | Bora | 60/902 |
| 3,236,045 | 2/1966 | Berger | 60/275 |
| 3,376,695 | 4/1968 | Muckley | 60/902 |
| 3,440,800 | 4/1969 | Messen-Jaschin | 60/275 |
| 4,098,578 | 7/1978 | Stanton | 60/275 |
| 5,050,377 | 9/1991 | Eng | 60/275 |

Primary Examiner—Douglas Hart
Attorney, Agent, or Firm—Fay, Sharpe, Beall, Fagan, Minnich & McKee

[57] ABSTRACT

Apparatus for the cleaning of fluid moving along a path of travel comprising a first container having a longitudinal axis, the container having an input end for the receipt of the fluid to be purified, an output end for the discharge of the cleaned fluid and sequential zones therebetween; an input zone within the container located adjacent to the input end with an ozone injector operatively associated with the input end followed by first isolation chambers in the input zone for the passage therethrough of ozone and fluid being cleaned, the first isolation chambers having fins defining channels located along the axis of the container; an output zone within the container located adjacent to the output end, the output zone including second isolation chambers for the passage therethrough of ozone and fluid being cleaned, the second isolation chambers having fins defining channels located along the axis of the container; and a dynamic mixing zone with mechanisms between the input and output zones for intermixing the ozone and fluid flowing therethrough.

7 Claims, 7 Drawing Sheets

FLUID PURIFICATION WITH ISOLATION CHAMBERS

BACKGROUND OF THE INVENTION

1. Field of the Invention

This invention relates to fluid purification with isolation chambers and, more particularly, to feeding the output of an internal combustion engine through an ozone injector, catalytic media, isolation chambers, a dynamic mixing zone, additional isolation chambers and additional catalytic media for purification of the air.

2. Description of the Background Art

In the field of air treatment, great efforts are continuously being made to reduce the quantity and concentration of pollutants found in air being discharged into the atmosphere. This is evidenced by more and stricter governmental regulations and requirements relating to air treatment processes and discharges. The quantities of air requiring treatment are constantly and rapidly increasing. Concurrently, the levels of contaminants found within discharged air from a wide variety of sources must be reduced to increasingly lower limits as mandated by governmental regulations.

Accordingly, the present invention is directed to improving methods and apparatus for the purifying of air. It is particularly adapted for use in association with the output of internal combustion engines. It is, however, applicable to any fluid, liquid or gas. It is safe, convenient and economical.

As illustrated by the large number of commercial devices and background patents, efforts are continuously being made in an attempt to improve methods and apparatus for purifying air. No prior effort, however, provides the benefits attendant with the present invention. Additionally, the known and commercial techniques do not suggest the present inventive combination of component elements and method steps arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

Therefore, it is an object of this invention to provide an improvement which overcomes the aforementioned inadequacies of the prior art devices and provides an improvement which is a significant contribution to the advancement of the art.

Another object of this invention is to intermix ozone and a fluid to be cleaned through a combination of isolation chambers and a dynamic mixer.

Another object of this invention is to clean air through its passage through catalytic media preceded by ozone injection.

Another object of the invention is to reduce automotive emissions for cleaning the atmosphere.

Another object of the invention is to provide apparatus for the cleaning of fluid moving along a path of travel comprising a first container having a longitudinal axis, the container having an input end for the receipt of the fluid to be purified, an output end for the discharge of the cleaned fluid and sequential zones therebetween; an input zone within the container located adjacent to the input end with an ozone injector operatively associated with the input end followed by first isolation chambers in the input zone for the passage therethrough of ozone and air being cleaned, the first isolation chambers having fins defining channels located along the axis of the container; an output zone within the container located adjacent to the output end, the output zone including second isolation chambers for the passage therethrough of ozone and fluid being cleaned, the second isolation chambers having fins defining channels located along the axis of the container; and a dynamic mixing zone with mechanisms between the input and output zones for intermixing the ozone and fluid flowing therethrough.

The foregoing has outlined some of the pertinent objects of the invention. These objects should be construed to merely be illustrative of some of the more prominent features and applications of the intended invention. Many other beneficial results can be attained by applying the disclosed invention in a different manner of modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new and improved system for the purification of contaminated exhaust air from an internal combustion engine as it moves along a path of travel through the system comprising, in combination: a cylindrical container having a longitudinal axis positionable in a horizontal orientation, the container having an input end for the receipt of the air to be purified, an output end for the discharge of the purified air to the atmosphere and sequential zones therebetween; an input zone within the container adjacent to the input end, the input zone including an ozone injector operatively associated with the input end followed by a first canister with catalytic media therein followed by first isolation chambers for the passage therethrough of ozone and air to be cleaned, the first isolation chambers having fins in a cross-shaped configuration with its center located along the axis of the container, the fins having radially remote ends in contact with the interior surface of the container; an output zone within the container located adjacent to the output end, the output zone including second isolation chambers for the passage therethrough of ozone and air to be cleaned, the second isolation chambers having fins in a cross-shaped configuration with its center located along the axis of the container, the fins having radially remote ends in contact with the interior surface of the container, the fins of the second isolation chambers being rotationally offset from the fins of the first isolation chambers. A support rod intermediate the input zone and the output zone with its axis located along the axis of the container and a plurality of propellers rotatably secured to the rod with each propeller having a plurality of blades, each propeller having its blades pitched for counter-rotation with respect to each next adjacent propeller; a second canister with catalytic media therein located in association with the container adjacent to the output end following the second isolation chambers; and a housing coupled with respect to the cylindrical container exterior thereof adjacent to the input end, the housing having an ozone generator therein for the generation of ozone from atmospheric air and a tube for the feeding of the ozone to the ozone injector.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference numerals refer to similar parts throughout the several views of the drawings.

DETAILED DESCRIPTION OF THE PREFERRED EMBODIMENT

Figure 1:
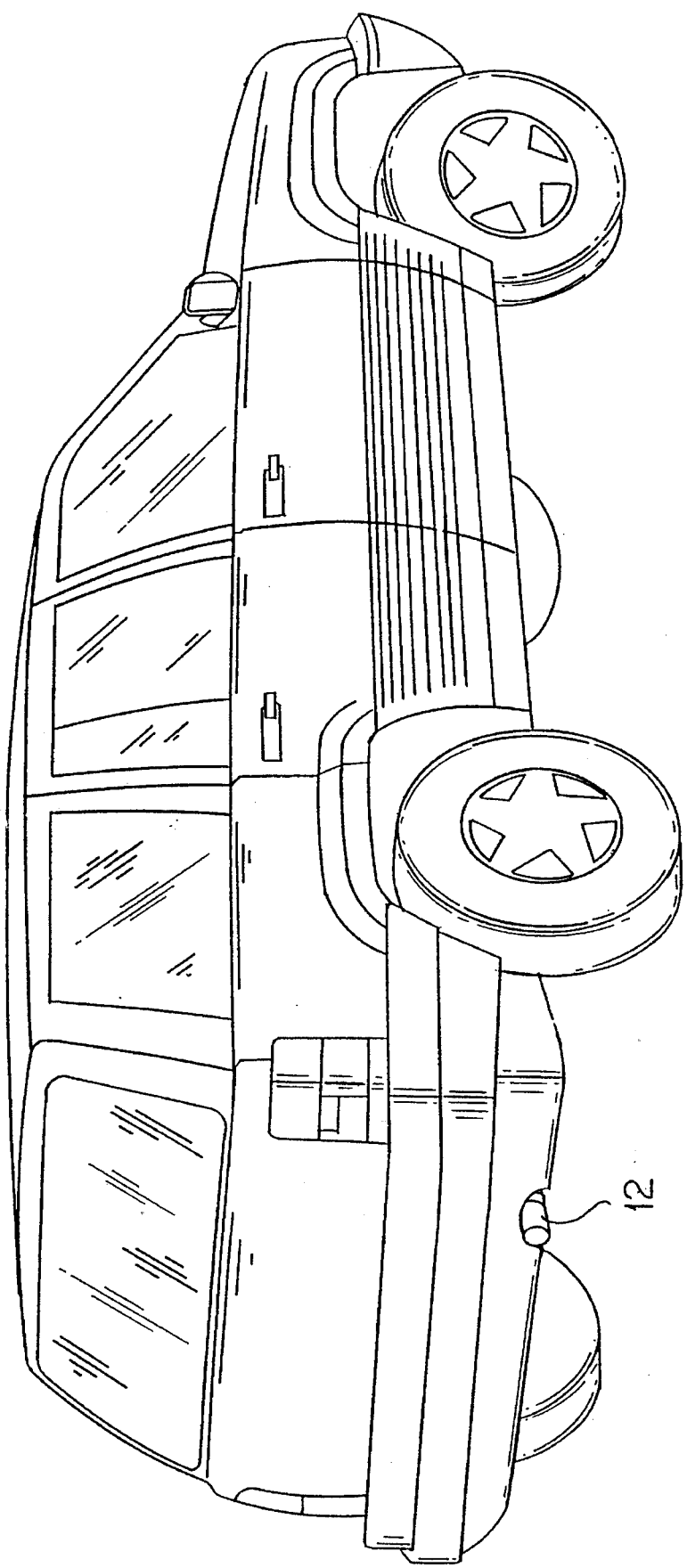
FIG. 1 is a perspective illustration of an automobile utilizing the new and improved fluid purification with isolation fins constructed in accordance with the principles of the present invention.
Figure 2:
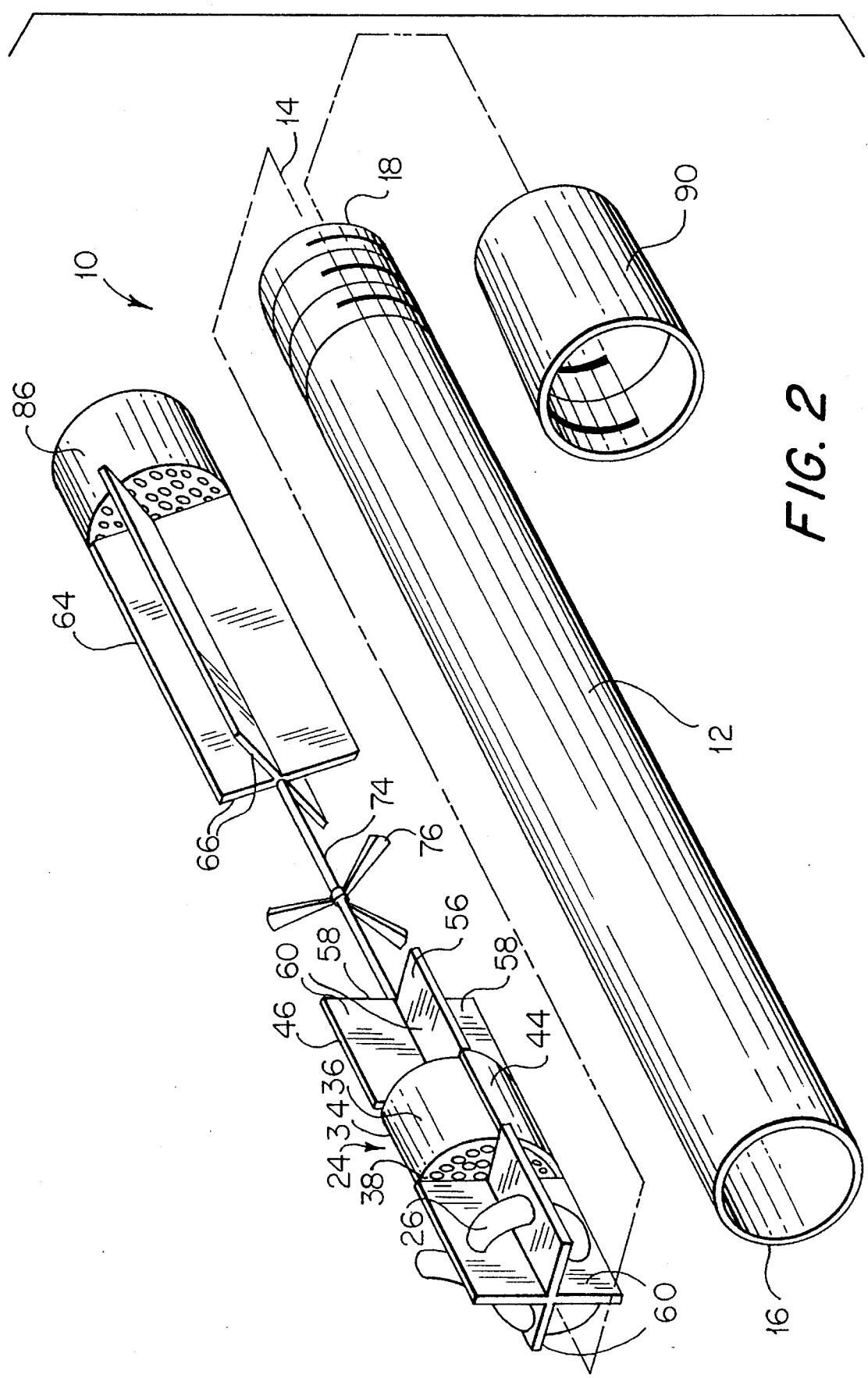
FIG. 2 is an exploded perspective view of the tailpipe illustrating certain internal components.
Figure 3:
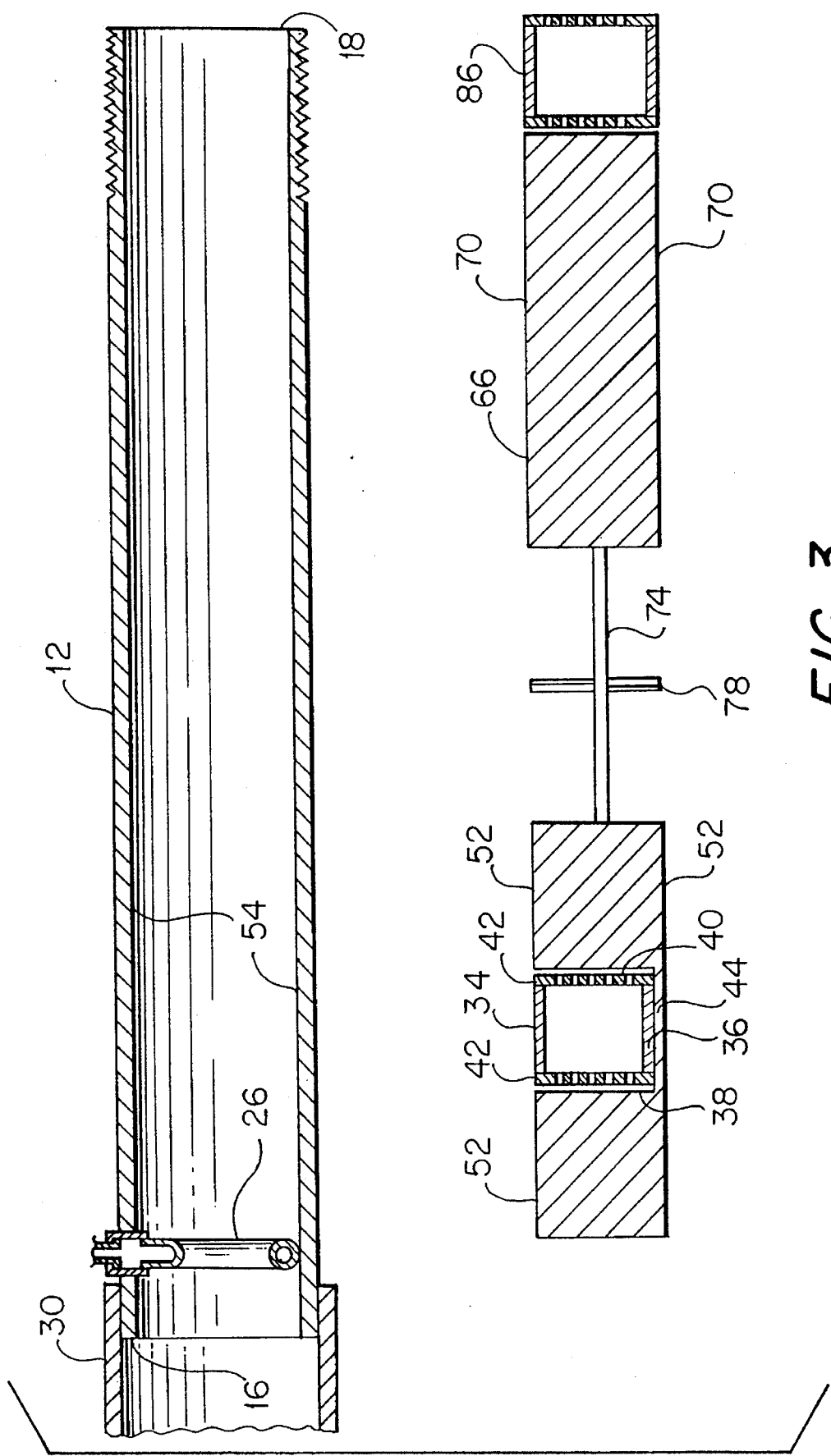
FIG. 3 is a cross-sectional illustration of the tailpipe shown in FIG. 2.
Figure 4:
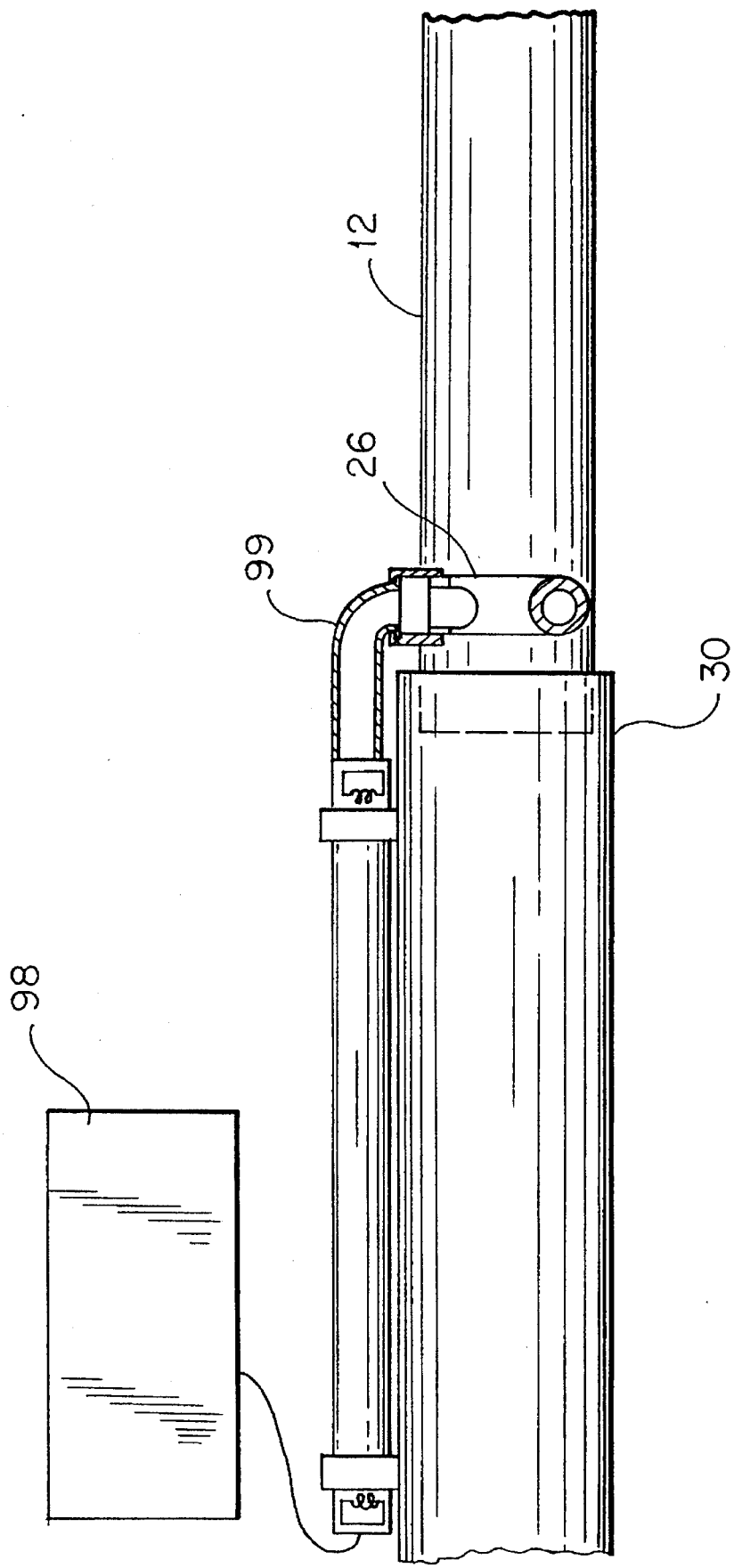
FIG. 4 is a schematic illustration of the components for generating the ozone prior to dispersion through the ozonator into the cylinder.
Figure 5:
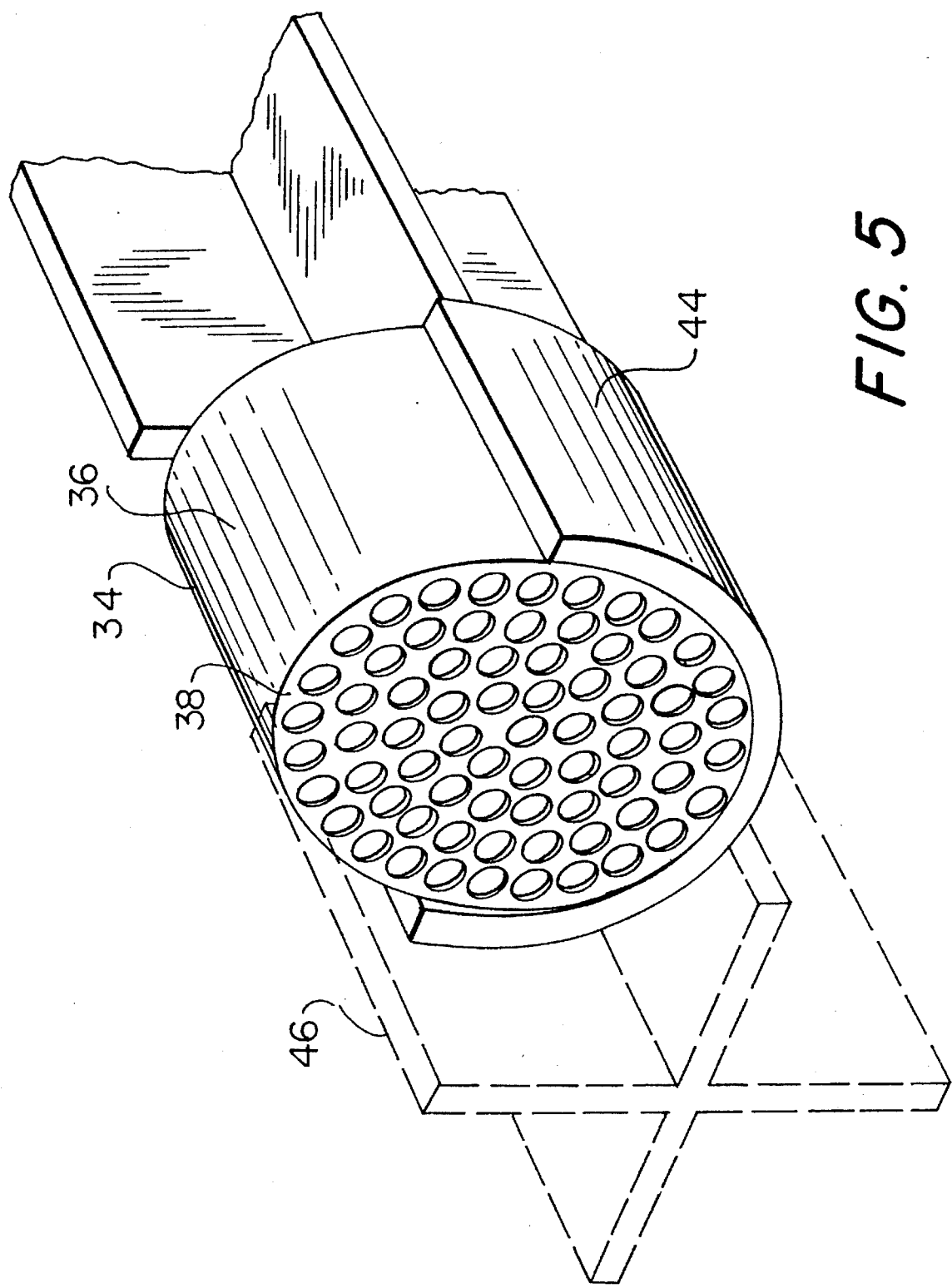
FIG. 5 is a perspective illustration of the first isolation chambers including a strap holding the first canister in position.
Figure 6:
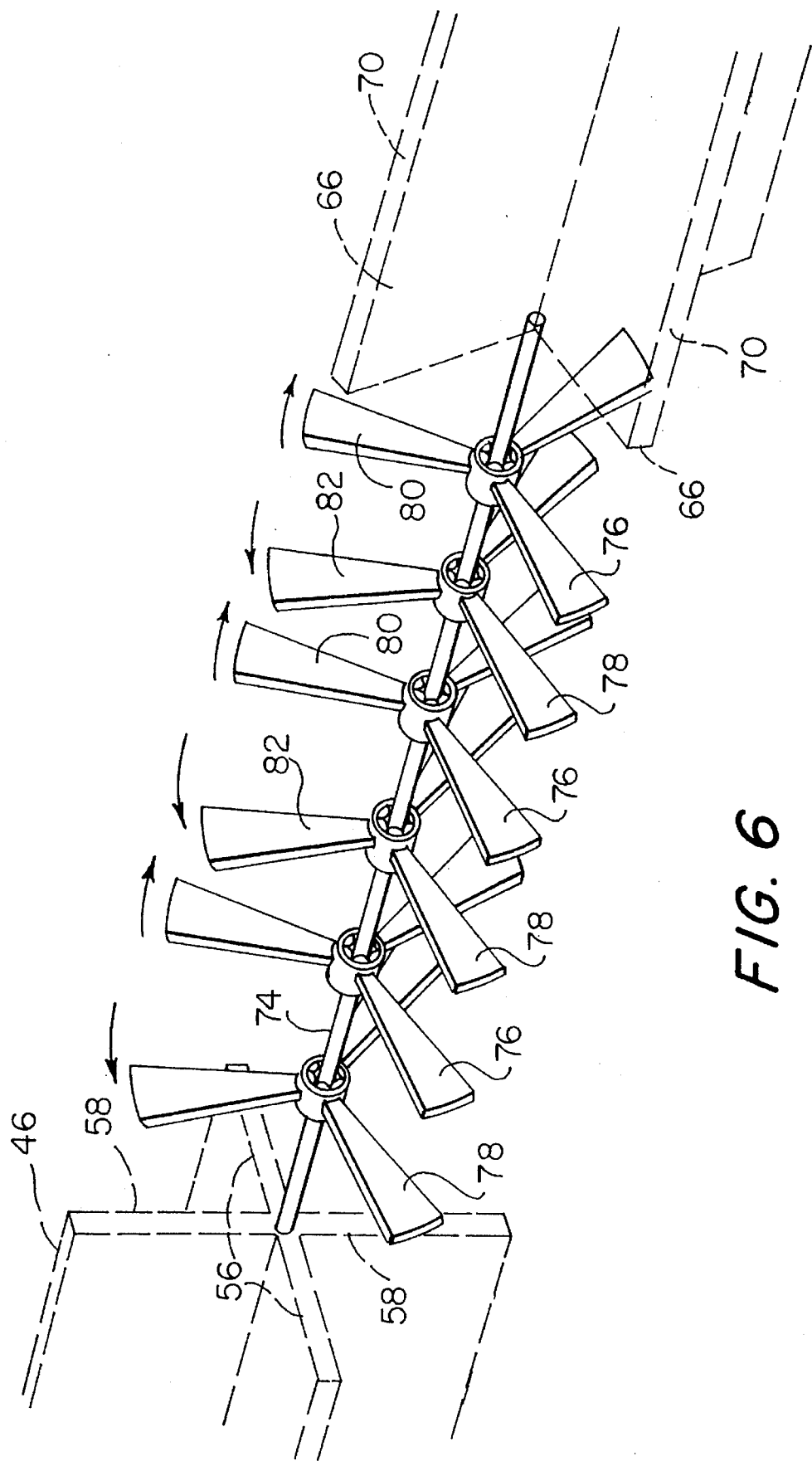
FIG. 6 is a perspective illustration of a portion of the intermediate zone illustrating two of the propellers of opposite pitch rotatably secured to the fixed rod.
Figure 7:
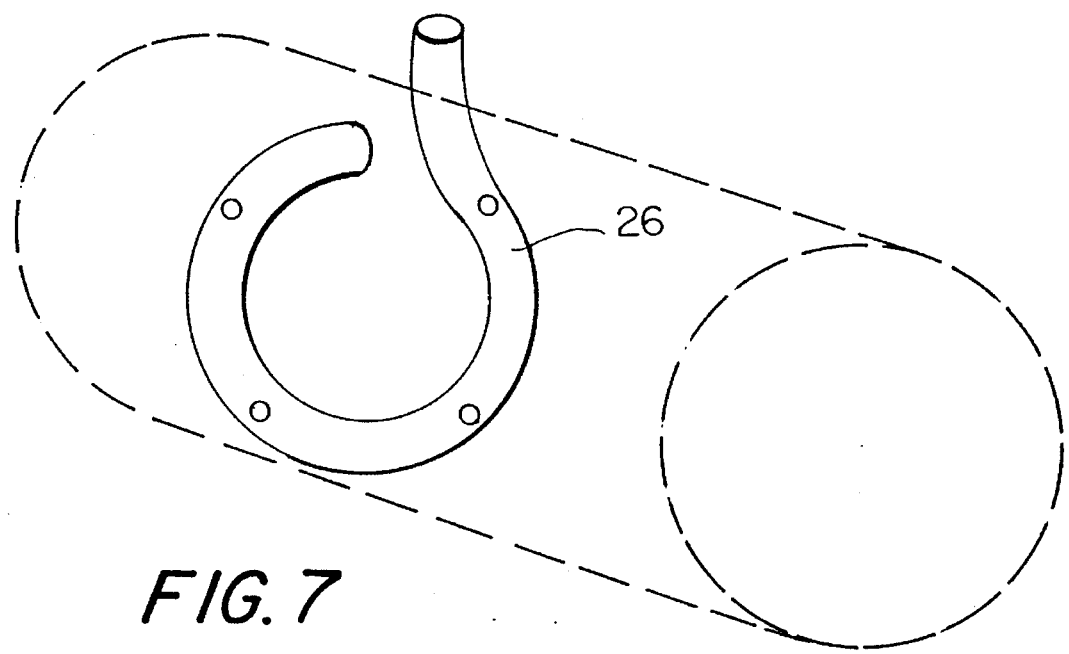
FIG. 7 is a perspective illustration of the inboard end of the cylinder coupled with respect to the ozonator.
Figure 8:
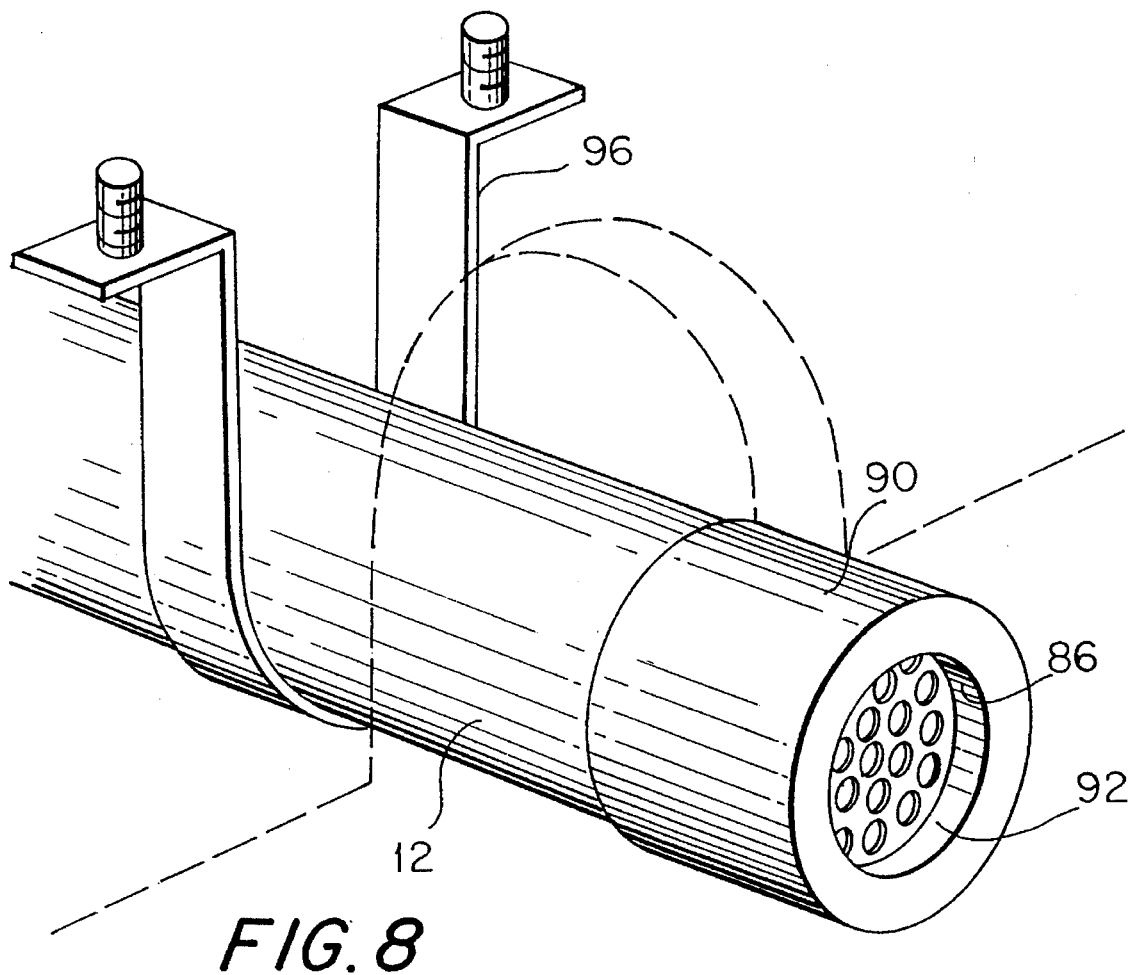
FIG. 8 is a perspective view of the output end of the cylinder illustrating its coupling with respect to the vehicle for removal for repair and reconstruction.

The present invention, the new and improved fluid purification with isolation fins is comprised of a plurality of component elements. The individual elements are specifically configured and correlated with respect to each other to attain the desired objective. From its broadest standpoint, such component elements include a cylindrical container, an input zone, an output zone, a support rod between the zones with propellers rotatably mounted on the rod, canisters with catalytic media and a housing for ozone generation.

More specifically, the central component of the system 10 is a cylindrical container 12. Such container has a longitudinal axis 14 and is positionable in a horizontal orientation. The container has an input end 16 for the receipt of air to be purified. It also has an output end 18 for the discharge of the purified air to atmosphere. Located therebetween are sequential purification zones 20.

The system 10, including the container 12, are adapted to be utilized, in the primary embodiment, as a replacement for the tailpipe of an automobile or other vehicle. Consequently, its input end is located following the output of exhaust from the internal combustion engine. The output end of the system and cylindrical container are located beyond the remainder of the vehicle for discharge of the purified air to atmosphere. Note FIG. 1. The container and its contents are preferably removably mounted in its operative orientation so as to allow ready removal for repair, replacement or refurbishing of the device or component elements.

Within the container is the input zone 24. It is located adjacent to the input end. The input zone includes an ozone injector 26 operatively associated with the input end. The ozone injector is placed upstream from the other components of the container 12 following the internal combustion engine. The downstream component 30 functions as a receiving element for the input end of the container for holding it in position when in operation and use.

Next following the ozone injector and located within the container is a first canister 34. Such canister is of a cylindrical configuration with an imperforate sidewall 36 and a planar apertured disks 38 and 40 secured by holding components 42 at opposite faces of the canister. The canister rests on a strap 44 coupling forward and rearward sections of the first isolation chambers. In this manner, when the other components within the container are removed through pulling, the canister will also be removed therewith. Located within the canister is a catalytic media, preferably manganese dioxide.

In the preferred embodiment, the particulate material is any one of several commercially available materials, principally containing manganese dioxide in excess of 99 percent, with trace materials in amounts to enhance the catalytic and oxidation properties of the base manganese dioxide. Such granules conventionally range between 20–50 mesh and 90–100 mesh. This is between about 125 and 710 microns, about 0.058 and 0.0328 inches. Trace materials include, for example, aluminum, copper, iron, magnesium, nickel, silicon and zinc. Other like media, commercially available or other, could be readily used. Even though the particulate material increases the speed at which chemical reactions occur within the containers, the particulate material does not affect the equilibrium of the reactions.

Next following the canister and catalytic media is a first set of fins 46 functioning as isolation chambers. Such fins divide the path for the air to be cleaned into four pie-shaped passageways or channels of reduced cross-section. In this manner, the particulate material entrained in the air, which tends to move down, may still efficiently interact with ozone bubbles, which tend to move up. Such smaller channels allow greater ozone to air interaction since they are in closer physical proximity to each other. Without the isolation chambers, the particulate material and ozone bubbles would tend to move to a greater distance from each other for reduced cleaning capabilities.

The first isolation chambers has a pair of fins secured in a cross-shaped configuration. Its center is located along the axis of the container. The fins have radially remote ends 52 in contact with the interior surface 54 of the container. In this manner, the fins and mixer will be maintained at a proper orientation centrally disposed within the container. The fins include a horizontal fin 56 and a vertical fin 58 to form 90 degree segments. One hole is preferably provided in the ozone injector for each channel facing down stream of the air flow. Any number of fins might be utilized to reduce the size of the channels 60 through which the air and ozone pass.

The next functioning component of the system is the output zone 64. The output zone is located within the container adjacent to the output end. The output zone includes a second set of fins 66. Such fins are also for the passage therethrough of ozone and air moved from the first isolation chambers. The second fins are also provided with fins in a cross-shaped configuration. Again, like the first cross-shaped fins, its center is located along the axis of the container. And once again, the fins have radially remote ends 70 in contact with the interior surface of the container for proper positioning. For greater efficiency, the fins of the second isolation chambers are preferably rotationally offset from the fins of the first isolation chambers. In other words, the fins are not horizontally and vertically disposed within the container. Rather, they are offset by about 45 degrees. Their function is the same as that of the first isolation chambers of insuring the closure physical contact and greater efficiency of the interacting air and ozone.

Located intermediate the input zone and the output zone is a support rod 74. The support rod is a rigid member physically secured at its ends to the adjacent ends of the first and second isolation chambers. The axis of the rod is located along the axis of the container.

Mounted upon the support rod are a plurality of propellers 76 and 78. Such propellers are rotatably secured to the rod with each propeller having a plurality of blades 80 and 82. The blades of each propeller are provided with an appropriate pitch for counter-rotation with respect to each next adjacent propeller when air moves thereadjacent from the input zone to the output zone thereby providing rotational forces to the propellers due to the respective pitches of the propeller. This action thereby provides a dynamic mixer which is powered by the air or other fluid itself which is being cleaned. It further tends to intermix the air to be cleaned with its particulate material with respect to the ozone providing the cleaning and purification action through the particulate material to be removed from the air. It also positions the ozone in closer proximity to the particulate material in the air to be cleaned prior to passage through the second isolation chambers.

Also preferably provided with respect to the container is a second canister 86. The second canister is physically constructed similar to the first canister. It has therein catalytic media for contact with the air to be cleaned. It is located in association with the container adjacent to the output end of the canister. This follows the second isolation chambers. It may be located within the container. It is preferably located in a short supplemental container 90 which removably attaches at its input end to the output end of the container through screw threads. In this manner, the second canister could readily be removed when maintenance is required. Such container 90 has an aperture 92 for the passage of the purified air from the primary container 12.

Other types of media or supplemental canisters with further media such as carbon could also be utilized adjacent to canister 86. Other types of media could be utilized.

The entire arrangement of the container 12 and its internal components are held in place by the supplemental container 90 removably attached adjacent to the output end of the container. Removing of the supplemental container allows the user to simply reach and grasp the second container and remove it and then grasp the downstream end of the second isolation chambers and pull it out of the container. All interior components will follow and be removed. The ozone injector has threaded coupling components 94 removably securing it to an ozone generator which must, of course, first be disconnected.

In addition, a strap and post assembly 96 coupling the container and the vehicle must be disengaged to allow the container and its contents to be pulled from the output end of the internal combustion engine for its repair, replacement and/or maintenance.

One last component of the system is a housing. Such housing is coupled with respect to the cylindrical container exterior thereof adjacent to the input end. It is preferably secured with respect to the engine block or adjacent components. The housing has therein an ozone generator 98 for the generation of ozone for being fed from atmospheric air to the ozone injector. A tube 99 couples the ozone generator 98 and injector 26 for feeding of the ozone from its generation to its use.

As such, air to be cleaned is moved from the exhaust of the internal combustion engine through the container from input end to output end through the operational components of the system. Similarly, ambient air is received by the ozone generator and fed to the ozone injector for being intermixed with the air to be cleaned adjacent to the input end for movement with the air to effect its cleaning in association with the canisters of media, isolation chambers and dynamic mixing zone.

The present invention also includes the method for the cleaning of fluid moving along a path of travel. The method includes the step of providing a container having a longitudinal axis, the container having an input end for the receipt of the fluid to be purified, an output end for the discharge of the cleaned fluid and sequential zones therebetween. The method also includes the step of providing an input zone within the container located adjacent to the input end with an ozone injector operatively associated with the input end followed by first isolation chambers in the input zone for the passage therethrough of ozone and fluid being cleaned, the first isolation chambers having fins defining channels located along the axis of the container. The method also includes the step of providing an output zone within the container located adjacent to the output end, the output zone including second isolation chambers for the passage therethrough of ozone and fluid being cleaned, the second isolation chambers having fins defining channels located along the axis of the container. The method also includes the step of providing a dynamic mixing zone with mechanisms between the input and output zones for intermixing the ozone and fluid flowing therethrough. The method also includes the step of feeding a flow of fluid to be cleaned through the container from the input end to the output end. The method also includes the step of feeding a flow of ozone through the container from the ozone injector to the output end. The method also includes the step of mixing the ozone and fluid in the dynamic mixing zone through the movement of the ozone and fluid therethrough.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:
1. A new and improved system for the purification of contaminated exhaust gas from an internal combustion engine as it moves along a path of travel through the system comprising, in combination:

- a cylindrical container having a longitudinal axis positionable in a horizontal orientation, the container having an input end for the receipt of the gas to be purified, an output end for the discharge of the purified air to the atmosphere and sequential zones therebetween;
- an input zone within the container adjacent to the input end, the input zone including an ozone injector operatively associated with the input end followed by a first canister with catalytic media therein followed by first isolation chambers for the passage therethrough of ozone and gas to be cleaned, the first isolation chambers having fins in a cross-shaped configuration with its center located along the axis of the container, the fins having radially remote ends in contact with the interior surface of the container;
- an output zone within the container located adjacent to the output end, the output zone including second isolation chambers for the passage therethrough of ozone and gas to be cleaned, the second isolation chambers having fins in a cross-shaped configuration with its center located along the axis of the container, the fins having radially remote ends in contact with the interior surface of the container, the fins of the second isolation chambers being rotationally offset from the fins of the first isolation chambers;
- a support rod intermediate the input zone and the output zone with its axis located along the axis of the container and a plurality of propellers rotatably secured to the rod with each propeller having a plurality of blades, each propeller having its blades pitched for counter-rotation with respect to each next adjacent propeller;
- a second canister with catalytic media therein located in association with the container adjacent to the output end following the second isolation chambers; and
- a housing coupled with respect to the cylindrical container exterior thereof adjacent to the input end, the housing having an ozone generator therein for the generation of ozone from atmospheric air and a tube for the feeding of the ozone to the ozone injector.

2. Apparatus for the cleaning of fluid moving along a path of travel comprising:

- a first container having a longitudinal axis, the container having an input end for the receipt of the fluid to be purified, an output end for the discharge of the cleaned fluid and sequential zones therebetween;
- an input zone within the container located adjacent to the input end with an ozone injector operatively associated with the input end followed by first isolation chambers in the input zone for the passage therethrough of ozone and fluid being cleaned, the first isolation chambers having fins defining channels located along the axis of the container;
- an output zone within the container located adjacent to the output end, the output zone including second isolation chambers for the passage therethrough of ozone and fluid being cleaned, the second isolation chambers having fins defining channels located along the axis of the container; and
- a dynamic mixing zone with mechanisms between the input and output zones for intermixing the ozone and fluid flowing therethrough.

3. The apparatus as set forth in claim 2 wherein the mechanisms are driven by the flow of ozone and fluid therethrough.

4. The apparatus as set forth in claim 3 wherein the mechanisms include a support rod intermediate the input zone and the output zone with its axis located along the axis of the container and a plurality of propellers rotatably secured to the rod with each propeller having a plurality of blades with the blades of each propeller being pitched for counter-rotation with respect to each next adjacent propeller.

5. The apparatus as set forth in claim 2 and further including:

- a second canister with catalytic media therein located in association with the container adjacent to the output end following the second isolation chambers.

6. The apparatus as set forth in claim 2 and further including:

- a housing secured to the first container exterior thereof adjacent to the input end, the housing having an ozone generator therein for the generation of ozone from atmospheric air and a tube for the feeding of the ozone to the ozone injector.

7. A method for the cleaning of fluid moving along a path of travel comprising:

- providing a container having a longitudinal axis, the container having an input end for the receipt of the fluid to be purified, an output end for the discharge of the cleaned fluid and sequential zones therebetween;
- providing an input zone within the container located adjacent to the input end with an ozone injector operatively associated with the input end followed by first isolation chambers in the input zone for the passage therethrough of ozone and fluid being cleaned, the first isolation chambers having fins defining channels located along the axis of the container;
- providing an output zone within the container located adjacent to the output end, the output zone including second isolation chambers for the passage therethrough of ozone and fluid being cleaned, the second isolation chambers having fins defining channels located along the axis of the container;
- providing a dynamic mixing zone with mechanisms between the input and output zones for intermixing the ozone and fluid flowing therethrough;
- feeding a flow of fluid to be cleaned through the container from the input end to the output end;
- feeding a flow of ozone through the container from the ozone injector to the output end; and
- mixing the ozone and fluid in the dynamic mixing zone through the movement of the ozone and fluid therethrough.

* * * * *